(12) United States Patent
Suzuki et al.

(10) Patent No.: US 6,518,719 B1
(45) Date of Patent: Feb. 11, 2003

(54) POWER TOOLS WITH OPERATING SPEED CONTROL CIRCUIT

(75) Inventors: Jiro Suzuki, Anjo (JP); Shin Sugiura, Anjo (JP)

(73) Assignee: Makita Corporation, Anjo ( * ) Notice: Subject to any disclaimer, the term of this patent is extended or adjusted under 35 U.S.C. 154(b) by 0 days.

(21) Appl. No.: 09/693,070

(22) Filed: Oct. 20, 2000

(30) Foreign Application Priority Data

Nov. 16, 1999 (JP) ............................................ 11-325235

(51) Int. Cl.[7] ................................................ H02P 1/04
(52) U.S. Cl. ...................... 318/430; 318/632; 318/636; 318/254; 318/439; 318/805; 318/806; 388/806; 388/815; 388/821; 388/928.1
(58) Field of Search ................................ 318/430, 632, 318/636, 254, 439, 805, 806; 388/806, 815, 821, 928.1

(56) References Cited

U.S. PATENT DOCUMENTS

| | | | |
|---|---|---|---|
| 4,168,454 A | 9/1979 | Gmeinder | 318/331 |
| 4,316,129 A | 2/1982 | Shapiro et al. | 318/313 |
| 4,414,500 A | 11/1983 | Schneider | 318/799 |
| 4,734,629 A | 3/1988 | Lessig, III et al. | 318/332 |
| 4,810,942 A | 3/1989 | Anton | 318/327 |
| 5,646,497 A | 7/1997 | Stickel | 318/799 |
| 5,760,553 A | 6/1998 | Astic et al. | 318/244 |
| 6,060,850 A | 5/2000 | Sakabe | 318/434 |
| 6,184,645 B1 * | 2/2001 | Brito et al. | 318/632 |
| 6,313,601 B1 * | 11/2001 | Kubo et al. | 318/799 |

FOREIGN PATENT DOCUMENTS

| | | | |
|---|---|---|---|
| DE | 26 22 656 C2 | 9/1982 | H02P/5/00 |
| DE | 35 19 840 C2 | 5/1991 | H02P/5/00 |
| DE | 34 29 427 C2 | 7/1991 | H02P/5/00 |
| DE | 44 07 634 A1 | 9/1995 | H02P/5/00 |
| JP | 10-248284 | 9/1998 | H02P/5/00 |

OTHER PUBLICATIONS

German Search Report from German Patent corresponding to U.S. patent 6,060,850.

* cited by examiner

Primary Examiner—Karen Masih
(74) Attorney, Agent, or Firm—Orrick Herrington & Sutcliffe LLP

(57) ABSTRACT

A variable speed power tool may include a speed adjusting device and/or a maximum speed adjusting device for adjusting the operating speed, and a fixed operating speed switch. An operator adjustable speed adjusting device having a position maintaining mechanism also may be utilized. When manipulated by the operator, the fixed operating speed switch gives priority to the adjusted position of the speed adjusting device and adjusts the operating speed to a preset operating speed. In the alternative, a switching device and an internal integrated circuit may be utilized to adjust the operating speed to a target speed using feedback control. The switching device preferably selects a voltage corresponding to the target speed from either a voltage representative of the position of the speed adjusting device or a predetermined voltage representative of the present operating speed.

28 Claims, 10 Drawing Sheets

(A)

(B)

POWER TOOLS WITH OPERATING SPEED CONTROL CIRCUIT

BACKGROUND OF THE INVENTION

1. Technical Field

The present invention relates to variable speed power tools and more particularly, to variable speed power tools in which the operator may adjust the operating speed of the power tools. The variable speed power tools may be driven by various power sources, including but not limited to direct current, e.g. batteries, alternating current and compressed air.

2. Description of the Relevant Art

Some types of power tools are capable of opening in both a low speed mode and a high speed mode. For example, power polishers utilized to apply wax to a surface have a buff that preferably rotates at a low speed immediately after the wax is applied to the buff, so that the wax will not fly off into the surrounding area& After the wax has become assimilated into the buff, the buff may rotate at a high speed. This high speed operation will improve the waxing efficiency of the buff.

In order to permit the operator to adjust the operating speed, variable speed power tools have been developed that are equipped with an operator adjustable speed adjusting device. In one type of variable speed power tools, the speed adjusting device has a position maintaining mechanism, which will maintain the adjusted position of the speed adjusting device, and therefore the operating speed of the power tool, until the operator again changes the setting position of the speed adjusting device. Representative examples of this type of speed adjusting device include (1) a dial that can be rotated by the operator and the dial will retain its position when the operator stops rotating the dial and (2) a sliding device that the operator can slide wherein the sliding device will retain its position after the position of the sliding device has been adjusted. Generally speaking, these known speed adjusting devices use variable resistors or potentiometers that adjust the operating speed by adjusting the current supplied to the power tool motor.

Power tools have also been developed that are equipped with a similar type of maximum speed adjusting device, which has a position maintaining function. In these types of known power tools, the operator can repeatedly adjust a speed adjusting device that is separate from the maximum speed adjusting device, which speed adjusting device is biased so that it will return to its original position after adjustment. Typically, the power tool will operate at higher speeds as the operator moves the speed adjusting device away from its original position. When the operator moves the speed adjusting device to the position that is furthest away from the original position, the maximum speed is obtained This maximum speed is determined by the adjusted position of the maximum speed adjusting device that incorporates the position maintaining mechanism, such as the above described dial or slide. Thus, when the speed adjusting device is in its maximum position, the maximum speed adjusting device solely determines the operating speed of the power tool.

When using a power tool equipped with a speed adjusting device having a position maintaining mechanism, the operator may set the desired operating speed. Thereafter, the operator is not required to constantly manipulate a switch or other device in order to maintain the desired operating speed. For other types of power tools equipped with a position maintaining mechanism and a separate speed adjusting device having a mechanism for biasing the speed adjusting device to return to its original position, a preset maximum speed can be obtained by merely adjusting the speed adjusting device to its maximum position.

Thus, the above-described power tools do not require the operator to further adjust the speed adjusting device or the maximum speed-adjusting device during operation and the power tool operation can be performed at the adjusted speed

SUMMARY OF THE INVENTION

However, if such known power tools are operated at the adjusted operating speed for an extended period and the operator must regularly change the operating speed to one or more operating speeds that are not regularly utilized, the operating speed adjusting operation can be burdensome. For example, when the operator uses a power polisher to polish a surface, operating the polisher at a high speed typically maximizes the polishing efficiency. However, it is necessary to apply more wax to the buff from time to time during this operation. After applying the wax to the buff, the operator must temporarily switch the polisher to a low speed mode, so that the newly applied wax does not fly off the buff Thus, the operator must adjust the speed adjusting device or the maximum speed-adjusting device from a high speed position to a low speed position.

However, the operator may have difficulty to quickly adjust the operating speed of the polisher before and after each application of the wax to the buff, because the speed adjusting device or the maximum speed adjusting device must be moved over a wide range to switch form the desired high speed to the desired low speed or from the desired low speed to the desired high speed. Further, it is especially difficult to quickly and reliably switch to the desired high operating speed after the wax has assimilated into the buff. Thus, if the operator determines a desirable operating speed that provides the highest waxing efficiency, it may be very difficult to locate that same desired high operating speed after applying more wax and operating the buff at a low speed to assimilate the wax into the buff.

Thus, it is one object of the present invention to teach improved power tools that overcome some or all the above-mentioned problems with known variable speed power tools.

In one aspect of the present teachings, power tools are taught that can temporarily switch from a first operating speed, such as a maximum operating speed, to a second operating speed, such as a minimum operating speed In another aspect of the present teachings, variable speed power tools are taught that have a fixed operating speed switch and an operator adjustable speed adjusting device having a position maintaining mechanism. When the fixed operating speed switch is closed, the operating speed of the power tool changes to an operating speed that may be, for example, preset by the operator or the manufacturer. If such a fixed operating speed switch is included in the power tool, the operator can easily change to a preset operating speed that is appropriate for certain operations. In that case, the operator is not required to adjust the position of the speed adjusting device to a position that corresponds to the preset operating speed Rather, simply by switching the fixed operating speed switch, it is possible to temporarily change to the appropriate preset operating speed Further, by disengaging or turning off the fixed operating speed switch, it is possible to return the power tool to the operating speed that corresponds to the position of the speed adjusting device. Because the speed adjusting device remains in the same position until moved by the operator, the power tool will be returned to the operating speed previously selected by the operator when the fixed operating speed switch is disengaged or turned off.

In another aspect of the present teachings, the power tool may include a preset maximum speed switch in addition to an operator adjustable maximum speed adjusting device having a position maintaining mechanism and an operator adjustable speed adjusting device having no position maintaining mechanism. This type of power tool operates at its maximum speed when the operator adjusts the speed adjusting device to its full or maximum position, and the maximum speed so adjusted corresponds to the position of the operator adjustable maximum speed adjusting device. When the preset maximum speed switch is turned on, the maximum speed realized when the operator adjusts the speed adjusting device to its full or maximum position changes from the maximum speed corresponding to the position of the operator adjustable maximum speed adjusting device to a preset maximum speed that may be, for example, preset by the operator or the manufacturer. In this case, the operator is not required to adjust the position of the operator adjustable maximum speed adjusting device in order to temporarily change to the preset maximum speed.

In another aspect of the present teachings, power tools may include a fixed operating speed switch in addition to an operator adjustable maximum speed adjusting device an operator adjustable speed adjusting device. This type of power tool operates at its maximum speed when the operator adjusts the speed adjusting device to its full or maximum position, and the maximum speed so adjusted corresponds to the position of the operator adjustable maximum speed adjusting device. When the fixed operating speed switch is turned on, the operating speed of the power tool changes to the preset fixed speed that is previously chosen by the operator or the manufacturer. When the fixed operating speed switch is turned off, the operating speed of the power tool changes to the speed that is set by the adjustable positions of the operator adjustable maximum speed adjusting device and the operator adjustable speed adjusting device.

In another aspect of the present teachings, power tools may include a control circuit that adjusts the operating speed to match a target speed using feedback control. The target speed may be either the operating speed set by the speed adjusting device or a preset operating speed determined by the fixed operating speed switch. In one representative embodiment of this aspect, a voltage corresponding to the target speed is coupled to one input pin of the control IC and a voltage corresponding to the actual operating speed is input to another input pin of the control IC. A differential amplifier, or other similar circuit, may compare the two voltages to determine whether the actual operating speed should be increased or decreased in order to match the target speed For example, an ON signal inputted to a semiconductor device that controls the operating speed of the motor is delayed when the actual operating speed is higher than the target speed.

As a result of the present teachings, the operation of temporary switching to a previously determined operating speed or the operation of switching from the previously determined operating speed to the operating speed corresponding to the position of the speed adjusting device can be simplified and operating efficiency can be improved. Further, power tools of the present teachings can be realize at a low cost.

Throughout this specification, the term "a speed adjusting device having a position maintaining mechanism" is intended to mean any kind of device that can be utilized to control the operating speed of the power tool, which device will retain its setting until the operator again adjusts the device. Thus, in power tools equipped with such a speed adjusting device having a position maintaining mechanism, once the operator has set the speed adjusting device to the position that corresponds to the appropriate or desired operating speed, the operating speed will not change until the operator again changes the setting. Thus, the operator can perform the power tool operation at the set operating speed without further activity.

Other objects, features and advantages of the present teachings will be readily understood after reading the following detailed description together with the accompanying drawings and the claims.

DETAILED DESCRIPTION OF THE INVENTION

Figure 1:
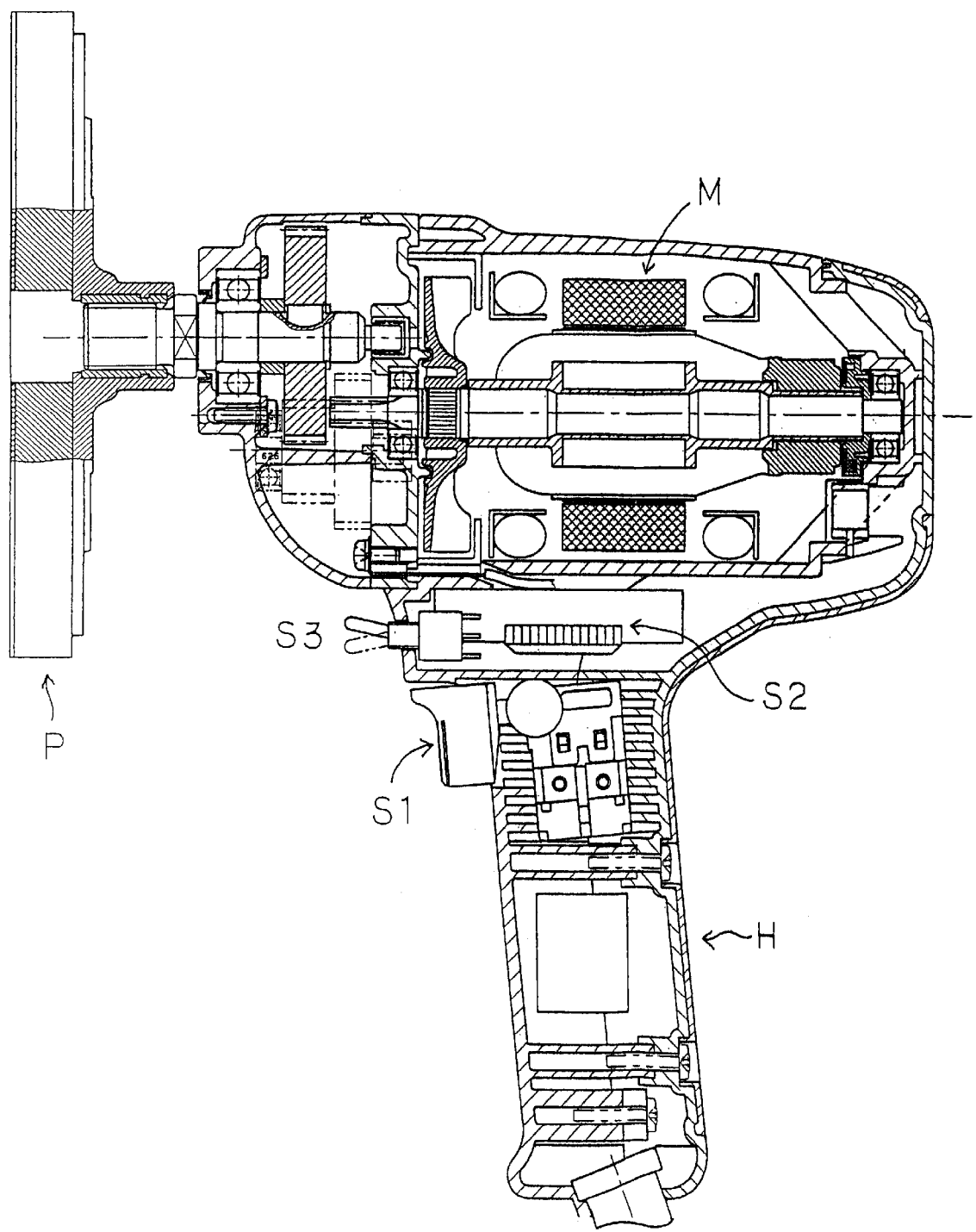
FIG. 1 shows a first representative electric polisher that is representative of the present teachings.

In one aspect of the present teachings, variable speed power tools are taught that may have a fixed operating speed switch and an operator adjustable speed adjusting device having a position maintaining mechanism. When the operator engages the fixed operating speed switch, the operating speed of the power tool changes to a preset operating speed. If such a fixed operating speed switch is included in the power tool, the operator can easily change to a preset operating speed that is appropriate for certain operations and the operator is not required to adjust the position of the speed adjusting device to a position that corresponds to the preset operating speed Rather, simply by switching the fixed operating speed switch, it is possible to temporarily change to the appropriate preset operating speed Further, by turning off the fixed operating speed switch, it is possible to return the power tool to the operating speed that corresponds to the position of the speed adjusting device. Thus, the fixed operating speed switch may have priority over the speed adjusting device for determining the target operating speed for the power tool.

The preset operating speed can be set either during the manufacturing process, in which case the operator can not change the preset operating speed, or the power tool may have an operator adjustable device that permits the operator to set the preset operating speed Preferably, the fixed operating speed switch has at least a first and second position. In the first position, the fixed operating speed switch preferably permits the operator adjustable speed adjusting device to determine the operating speed of the power tool. Thus, if the fixed operating speed switch is set to the first position, the operator can adjust the speed adjusting device to appropriately determine the operating speed In the second position, the fixed operating speed switch preferably has priority over the speed adjusting device and thus, the power tool will operate at the predetermined speed, regardless of the position of the speed adjusting device.

In another aspect of the present teachings, power tools may include a preset maximum speed switch in addition to an operator adjustable maximum speed adjusting device. An operator adjustable speed adjusting device having a return-to-origin mechanism can be provided to adjust the operating speed to an arbitrary operating speed that is between the maximum operating speed and the minimum operating speed. A "return-to-origin mechanism" is intended to mean a device that remains in a certain position only as long as the operator holds the device in that position. After the operator releases the return-to-origin mechanism, the device will automatically return to an original predetermined position. Accordingly, when the operator adjustable maximum speed adjusting device having a return-to-origin mechanism is moved to its maximum position (i.e., farthest position from origin), the operating speed is adjusted to a speed that corresponds to the position of the operator adjustable maximum speed adjusting device. When the present maximum speed switch is activated, the operating speed is adjusted to the preset maximum speed, because the operator adjustable speed adjusting device is in its maximum position.

In another aspect of the present teachings, power tools may include a fixed operating speed switch in addition to the operator adjustable maximum speed adjusting device and the operator adjustable speed adjusting device. The operator adjustable maximum speed adjusting device includes a position maintaining mechanism, and the operator adjustable speed adjusting device includes a return-to-origin mechanism. This type of power tool operates at its maximum speed when the operator adjusts the speed adjusting device to its full or maximum position, and the maximum speed so adjusted is controlled by the position of the operator adjustable maximum speed adjusting device. When the fixed operating speed switch is turned on, the operating speed of the power tool changes to the preset fixed speed that is previously chosen by the operator or the manufacturer. When the fixed operating speed switch is turned off, the operating speed of the power tool changes to the speed that was previously set by the positions of the operator adjustable maximum speed adjusting device and the operator adjustable speed adjusting device. The fixed operating speed switch has priority over the operator adjustable maximum speed adjusting device and the operator adjustable speed adjusting device. When the fixed operating speed switch is turned on, the operating speed of the power tool changes to the preset fixed speed regardless the positions of the operator adjustable maximum speed adjusting device and the operator adjustable speed adjusting device.

In another aspect of the present teachings, power tools may include a control circuit that controls the operating speed to match the target speed using feedback control. Preferably, this control circuit is implemented as an integrated circuit (IC) in order to minimize space requirements.

However, one or more functions necessary to control the operating speed to match the target speed using feedback control may be implemented off the IC. In one representative embodiment of this aspect, a voltage corresponding to the target speed is coupled to one input pin of the control IC and a voltage corresponding to the actual operating speed is input to another input pin of the control IC. A differential amplifier, or other similar circuit, may compare the two voltages to determine whether the actual operating speed should be increased or decreased in order to match the target speed For example, an ON signal output from an output pin of the control IC to a semiconductor element that controls the operating speed of the motor is delayed when the actual speed is higher than the target speed Preferably, the semiconductor element, which is utilized to control the operating speed of the motor, is a triac when alternating current is used to drive the motor.

The control IC may be combined with the speed adjusting device and the fixed operating speed switch that were described above. In that case, the target speed, which will be compared to the actual operating speed, is either the target speed set by the operator using the speed adjusting device or the target speed set by the fixed operating speed switch. That is, the speed adjusting device may include a circuit that generates a voltage representative of the target speed adjusted by the operator. Further, fixed operating speed switch may include a circuit that generates a voltage representative of the preset operating speed In such representative embodiments of the present teachings, the operating speed and the target speed, i.e. the operating speed adjusted by the operator and the preset operating speed, are compared Either the voltage representative of the position of the speed adjusting device or a preset voltage is input to the control IC that controls the operating speed to match the target speed using feedback control. While the voltage representative of the position of the speed adjusting device is being input, the operating speed is controlled by feeding back the voltage representative of the position of the speed adjusting device. While the preset voltage is being input, the operating speed is controlled by feeding back the voltage representative of the preset operating speed.

If a power tool is provided with both a maximum speed adjusting device having a position maintaining mechanism and a speed adjusting device having a return-to-origin mechanism, the control circuit may include an control IC that controls the operating speed to be the target speed using feedback control. A voltage representative of the target speed may be input to one input pin of the control IC and a voltage representative of the actual operating speed may be input to another input pin of the control IC. An ON signal may be output from an output pin to a semiconductor device, such as a triac, that controls the operating speed of the motor. The control IC may be combined with a switching means that is adapted to switch the voltage representative of the target speed to either (1) a voltage representative of the position of the maximum speed adjusting device divided by an value representative of the speed adjusting device or (2) a preset voltage divided by the value representative of the speed adjusting device.

In the alternative, the switching means may switch the voltage representative of the target speed to either (1) a voltage representative of the position of the maximum speed adjusting device divided by a value representative of the speed adjusting device or (2) a preset voltage. According to this alternative aspect, when a fixed operating speed switch is turned on, the operating speed of the power tool changes to the preset fixed speed. When the fixed operating speed switch is turned off, the operating speed of the power tool changes to the speed that is set by the positions of the operator adjustable maximum speed adjusting device and the operator adjustable speed adjusting device. The fixed operating speed switch has priority over the operator adjustable maximum speed adjusting device and the operator adjustable speed adjusting device.

Each of the additional features and method steps disclosed above and below may be utilized separately or in conjunction with other features and method steps to provide improved variable speed power tools and methods for making and using the same. Representative examples of the present teachings, which examples will be described below, utilize many of these additional features and method steps in conjunction. However, this detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the present teachings in the broadest sense, and are instead taught merely to particularly describe representative and preferred embodiments of the present teachings, which will be explained below in further detail with reference to the figures Of course, features and steps described in this specification may be combined in ways that are not specifically enumerated in order to obtain other embodiments of the present teachings.

In the following discussion and the attached drawings, the symbol R indicates a resistor, the symbol C indicates a capacitor, the symbol Q indicates a transistor, the symbol S indicates a switch, the symbol IC indicates an integrated circuit, the symbol P indicates a pin of an IC, the symbol E indicates an output signal, the symbol U indicates a node of the circuit and the symbol D indicates a diode.

Figure 2:
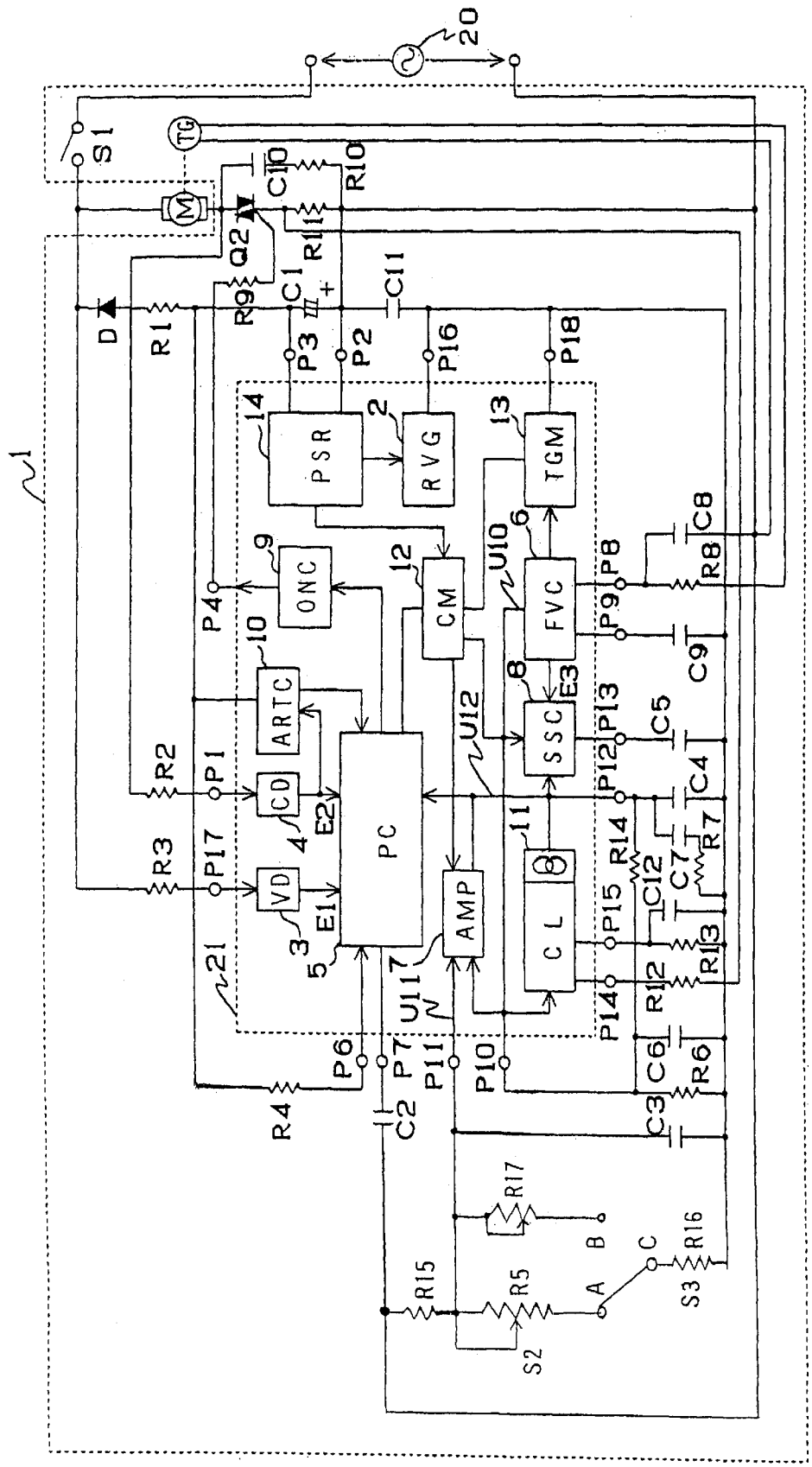
FIG. 2 shows an electrical circuit diagram of a first representative power controller that can be utilize with the representative electric polisher of FIG. 1.

A representative electric power polisher is shown in FIG. 1. FIG. 2 shows a first representative control circuit for controlling the operating speed of the motor. For each of the following representative embodiments, power tools that use AC commutator motors (hereafter abbreviated as motors) will be described. However, the present teachings are not limited to AC commutator motor& Instead, the present teachings may be utilized in power tools that have other types of drive sources, including but not limited to other types of AC motors DC motors and compressed air driven motors.

Referring to the electric power polisher of FIG. 1, the operator may grasp handle H and press buff P, which is rotated by motor M against the surface to be polished. In this manner, the surface will be polished by buff P. If the operator presses main switch S1, current will be supplied to motor M, thereby causing buff P to rotate. If the operator releases main switch S1, the current supplied to motor M will stop and buff P will stop rotating, because main switch S1 is normally biased towards the OFF position. The operator can adjust the operating speed of motor M while main switch S1 is turned ON by adjusting the position of speed adjusting device S2, which device S2 includes a dial for setting the target speed and has a position maintaining mechanism. In this representative embodiment, speed adjusting device S2 is a rotating type potentiometer. Thus, when the operator rotates the dial, the resistance of speed adjusting device S2 is adjusted. When the operator stops rotating the dial of speed adjusting device S2, the position of the dial is maintained, due to the attached position maintaining mechanism. Depending upon the position of speed adjusting device S2, the resistance of variable resistor R5, which will be described below, increases or decreases.

Switch S3 is mounted on handle H so that the operator can temporarily switch to a preset operating speed Preferably, the operator can operate fixed operating speed switch S3 while grasping the electric power polisher with one hand.

In this first representative embodiment, speed adjusting device S2 and fixed operating speed switch S3 will maintain the last position set by the operator, due to the position maintaining mechanisms of each switch. Therefore, after speed adjusting device S2 and fixed operating speed switch S3 have been adjusted, both will maintain the last position set by the operator until the next adjustment by the operator.

The configuration of representative control circuit 1 will be described with reference to FIG. 2. Electric power control circuit 1 is connected to AC power supply 20 and primarily includes main switch S1, a semiconductor device (triac Q2) that controls the supply of AC current from power supply 20 to motor M, and a control IC (IC21) that controls the arc timing of triac Q2.

IC21 preferably controls the operating speed of motor M using feedback control to match a target speed, as was discussed above. Preferably, a voltage corresponding to the target speed is input to input pin P11. A voltage corresponding to the actual operating speed of the motor is input to input pin P10. An ON signal (gate ON signal) is output from output pin P4 to the semiconductor device (eg. triac Q2) that controls the supply of current to motor M. Integrated circuits that include some or all the circuits shown in FIG. 2 and are suitable for use with the present teachings are, for example, part numbers U209B3-(FP), U211B2, and U211B3 manufactured by TEMICTELEFUNKEN Corp. of Germany.

Tachogenerator TG is connected to input pin P10 of IC21, which pin receives the voltage corresponding to the actual operating speed of the motor. Tachogenerator TG outputs a signal having a frequency that corresponds to the rotational speed of motor M. Converter (frequency/voltage converter, FVC) 6 converts the frequency from tachogenerator TG into a voltage that represents the actual operating speed of motor M.

Variable resistor R5 is connected to input pin P11, which pin receives a voltage corresponding to the target speed for the motor. When switch S3 is connected to contact A, variable resistor R5 determines the voltage that will correspond to the target speed for normal operation of motor M. Switch S3 is also coupled to input pin P11 via resistor R16 and capacitor C3. When switch S3 is connected to contact B, the voltage corresponding to the target speed of motor M is switched to a preset voltage that is determined by variable resistor R17. If switch S3 is connected to contact B, the target speed is determined solely by variable resistor R17, which is also connected to input pin P11. Thus, a preset voltage is input to pin P11 when fixed operating speed switch S3 is connected to contact B. The resistance of variable resistor R17 can either be set by the manufacturer at the factory or another operator adjustable dial or slide may be coupled to variable resistor R17 to permit the operator to determine the voltage of variable resistor R17.

As described above, the resistance of variable resistor R5 changes in response to the dial position of speed adjusting device S2. In this first representative embodiment, the resistance of variable resistor R17 is adjusted during the manufacturing process. Thus, the manufacturer sets the resistance of variable resistor R17, which is utilized to generate a specific voltage that corresponds to the preset operating speed. In this first representative embodiment "preset operating speed" is intended to mean a specific and constant motor operating speed that is set by the manufacturer during the manufacturing process. However, "preset operating speed" can also mean a specific and constant operating speed that can be set by the operator, which preset operating speed will not change unless the operator changes the setting of the preset operating speed An example of this operator set preset operating speed feature is described below.

In addition to controlling the rotating or operating speed of motor M, IC21 also can provide other functions to the power tool, such as motor soft starting and/or automatic re-triggering. IC21 also may contain the following circuit functions, which are shown in block diagram in the drawings, because circuits for implementing these functions are well known in the art:

power supply regulator (PSR) 14, reference voltage generator (RVG) 2, voltage detector (VD) 3 that detects the voltage supplied to motor M, current detector (CD) 4 that detects current flow to motor M, ON signal output circuit (ONC) 9 that outputs the gate-ON signal to triac Q2, phase controller (PC) 5 that controls the phase of the current applied to motor M by means of controlling the output timing of the gate-ON signal that is output from ON signal output circuit 9, frequency/voltage converter (FVC) 6 that is coupled to the signal output from tachogenerator TG and converts the frequency signal to a voltage that corresponds to the operating speed of motor M, differential amplifier (AMP) 7, soft start circuit (SSC) 8, automatic re-trigger circuit (ARTC) 10 that compensates for mis-triggering, current limiter (CL) 11, current monitor (CM) 12 that monitors the operating state of power supply regulator 14, and tachogenerator monitor (TGM) 13 that monitors the operating state of tachogenerator TG.

A series circuit including operation stabilizing capacitor C10 and resistor R10 may be connected in parallel to triac Q2.

Because triac Q2 receives an inductive load and changes in current will lag changes in voltage, current detector 4 will prevent ON signal output circuit 9 from sending a gate-ON signal to the gate of trac Q2 until the current crosses the AC zero point. The output E3 of frequency/voltage converter 6 is coupled to soft start circuit 8 and charges capacitor C5, which is connected to pin P13. By means of this charging circuit, soft start circuit 8 prevents, motor M from suddenly rotating at a high speed when main switch S1 is switched ON. Current limiter 11 detects the voltage at both ends of resistor R11. If the load current supplied to motor M suddenly and drastically increases, current limiter 11 causes current to be supplied to phase controller 5 from pin P12 to decrease the load current to motor M after the RC delay time determined by the values of resistor R12 and capacitor C12, in order to decrease voltage U12, thereby quickly reducing the current supplied to motor M.

Resistors R2, R3, R4 and R12 are connected to respective pins P1, P17, P6 and P14 of IC21. Pin P9 is connected to capacitor C9. Further, a parallel circuit including R13 and capacitor C12 is connected in series to pin P15; a parallel circuit including resistor R7 and capacitor C4 is connected in series to pin P12; and a parallel circuit including resistor R8 and capacitor C8 is connected in series to pin P8.

A voltage that corresponds to the target speed is input to input pin P11 of differential amplifier 7. A voltage representative of the actual operating speed of motor M, which has been converted by frequency/voltage converter 6, is input to input pin P10 of differential amplifier 7. Differential amplifier 7 outputs voltage U12 based upon the difference between the voltage corresponding to the target speed and the voltage corresponding to the actual operating speed. Output voltage U12 is coupled to phase controller 5. If the actual operating speed is slower than the target speed, the arc timing of triac Q2 can be accelerated in order to increase the rotating speed of motor M. Further, if the actual operating speed is faster than the target speed, the arc timing of triac Q2 can be delayed in order to decrease the rotating speed of motor M. By means of this feedback control, phase controller 5 adjusts the rotating speed of motor M to match the target speed.

In this specification, "arc timing" is intended to mean the timing within the sinusoidal power supply in which triac Q2 is turned on to thereby supply power to motor M. If the arc timing is early in the sinusoidal wave, the amount of power supplied to motor M is relatively large and motor M will rotate quickly. On the other hand, if the arc timing is late in the sinusoidal wave, the amount of power supplied to motor M is relatively small and motor will rotate slower. Thus, the arc timing determines the amount of power that is supplied to motor M and the operating speed of motor M.

Various representative embodiments will now be described that can generate a voltage representative of the target speed, which voltage is input to input pin P11 of differential amplifier 7.

Figure 3:
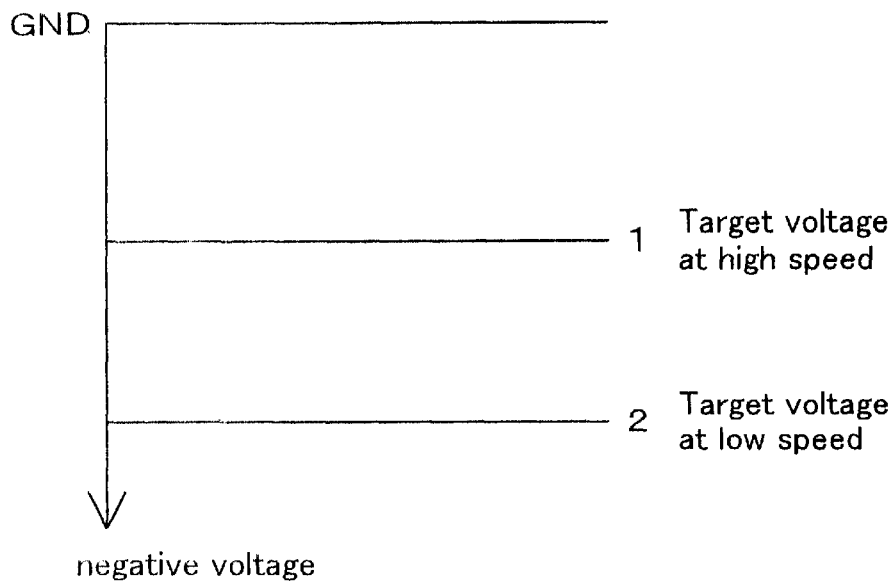
FIGS. 3 (A)–(D) graphically show feedback control by the controller of FIG. 2.
Figure 3:
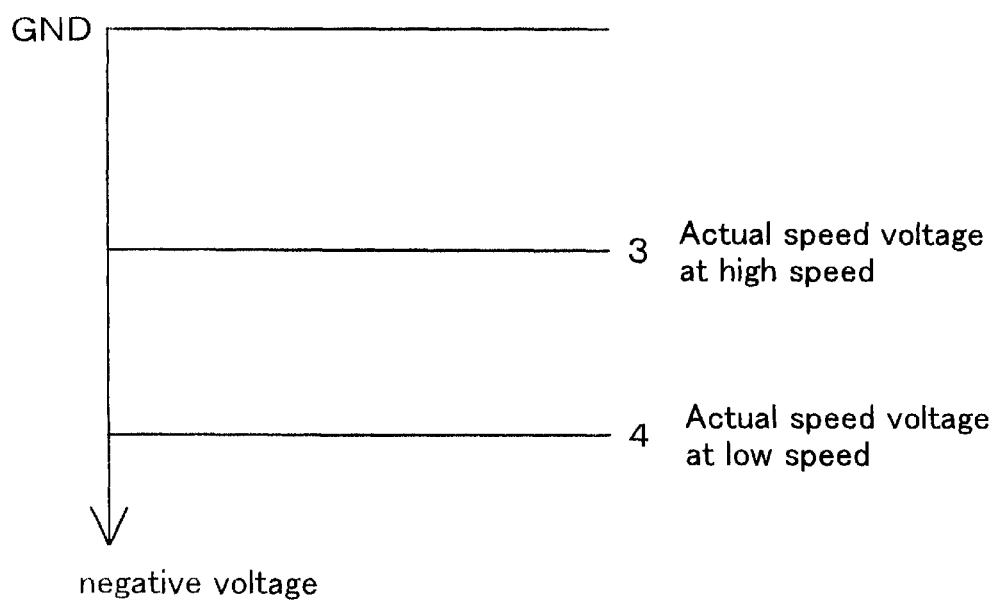
Figure 3:
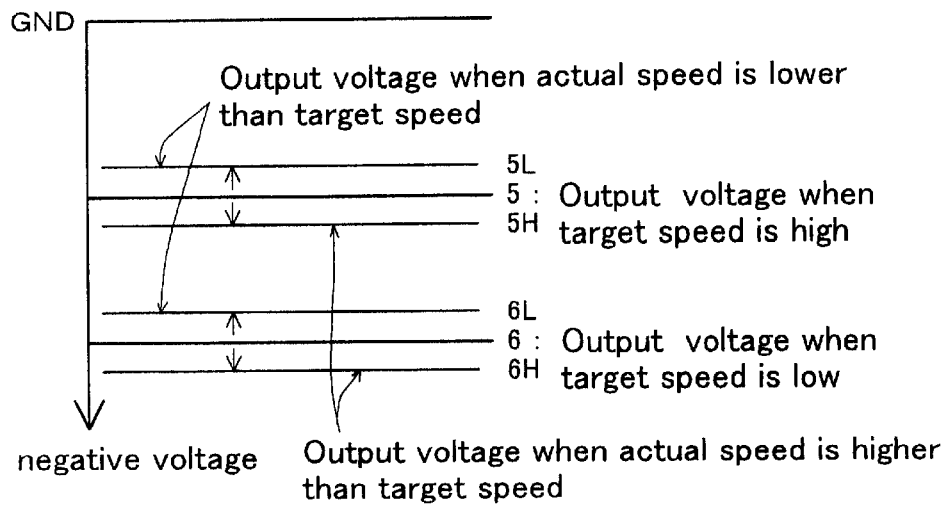
Figure 3:
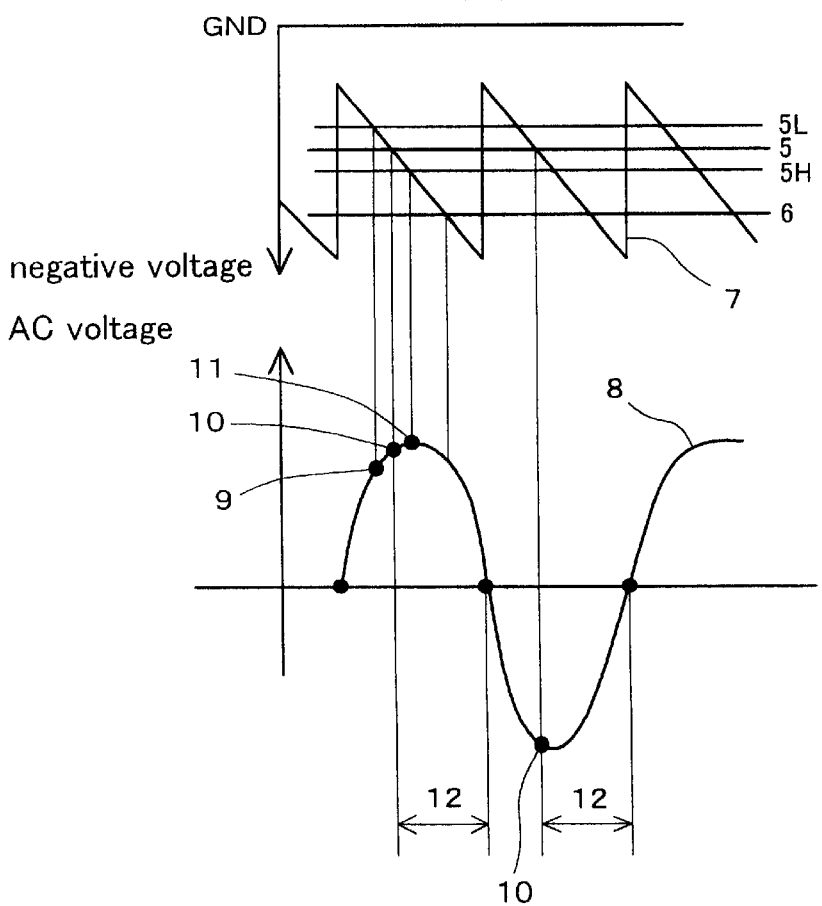

Referring to FIG. 2, reference voltage generator 2 applies a stabilized reference voltage to the bottom end of resistor R16, which reference voltage is negative. The top end of resistor R15 is grounded When fixed operating speed switch S3 is connected to contact A (off state or first position of switch S3), the reference voltage is divided by the ratio of the resistance of resistor R15 with respect to the sum of the resistances of variable resistor R5 and resistor R16, i.e., R1S/(R5+R16). The divided reference voltage is coupled to input pin P11 of differential amplifier 7. The resistance of variable resistor R5 is determined according to the dial position of speed adjusting device S2. In this embodiment, resistance R1 is relatively large when the dial position of speed adjusting device S2 is moved toward the high speed side. Naturally, resistance R5 is relatively small when the dial position of speed adjusting device S2 is moved toward the low speed side. Therefore, the voltage that is representative of the target speed (and input to input pin P11 of differential amplifier 7) will increase when the dial position of speed adjusting device S2 is moved to the high speed side and the voltage will decrease when the dial position of speed adjusting device S2 is moved to the low speed side. These two states are shown in FIG. 3(A), in which the voltage at node U11 is shown. Voltage 1 indicates the voltage generated when the dial position of speed adjusting device S2 is moved to the high speed side. Voltage 2 indicates the voltage generated when the dial position of speed adjusting device S2 is moved to the low speed side.

This voltage divider ratio for generating the voltage at node U11 can be increased and decreased by adjusting the dial position of speed adjusting device S2, which operation consequently adjusts the resistance of variable resistor R5. For example, when the dial position of speed adjusting device S2 is set at the high speed side, the divided reference voltage is relatively high. Because speed adjusting device S2 includes a position maintaining mechanism, the divided reference voltage set by the operator remains unchanged until the operator again moves the dial of speed adjusting device S2.

On the other hand, when fixed operating speed switch S3 is connected to contact B (on state or second position of switch S3), the reference voltage is divided by the ratio of the resistance of resistor R15 with respect to the sum of the resistances of variable resistor R17 and resistor R16, i.e., R15(R17+R16). This divided reference voltage is coupled to pin P11 of differential amplifier 7. In this case, the voltage representative of the target speed is not generated based upon variable resistance R5, because resistor R5 has been disconnected from the voltage divider.

As noted above, the resistance of variable resistor R17 in the first representative embodiment is set to a fixed resistance value during the manufacturing process. If the resistance of the variable resistor is a fixed value, when fixed operating speed switch S3 is connected to contact B, the target speed of motor M becomes a fixed operating speed Therefore, the operator can not adjust the fixed operating speed in this example. If the resistance of variable resistor 17 is set to the maximum resistance of variable resistor R5, the fixed operating speed that is generated when switch S3 is connected to contact B will be the maximum operating speed of the power tool. If the resistance of variable resistor 17 is set to the minimum resistance of variable resistor R5, the fixed operating speed that is generated when switch S3 is connected to contact B will be the minimum operating speed of the power tool. The designer is also free to select a fixed resistance value of variable resistor R17 that is between the minimum and maximum operating speeds of the power tool. In the alternative, as discussed further below, it is possible to make variable resistor R17 adjustable by the operator, instead of fixing the resistance during the manufacturing operation.

Normally, fixed operating speed switch S3 is connected to contact A and is manipulated by the operator to switch to contact B, which will cause motor M to rotate at the preset operating speed When switching from contact B to contact A, switch S3 also may be manipulated by the operator, which will cause motor M to rotate at the target speed determined by speed adjusting device S2.

A voltage corresponding to the operating speed that has been detected by tachogenerator TC and converted by converter 6 is input to one pin P10 of differential amplifier 7. As indicated in FIG. 3(B), this voltage is relatively high during high speed rotation and relatively low during low speed rotation.

Input pin P11 is preferably feedback-connected to the output of differential amplifier 7 via capacitors a and C3. As shown in voltage level 5 and voltage level 6 of FIG. 3(C), a relatively high voltage is output from differential amplifier 7 when the target speed is high (see level 5) and a relatively low voltage is output when the target speed is low (see level 6). However, when the actual operating speed is low compared to the target speed, the output voltage is corrected to be high (see voltage levels 5L and 6L). Similarly, when the actual operating speed is high compared to the target speed, the output voltage is corrected to be low (see levels 5H and 6H). These adjustments permit motor M to reach the desired operating speed more quickly.

A representative method for operating control circuit 1 of the first representative embodiment will now be described First, a method will be described for the situation in which switch S3 is connected to contact A, i.e. the operator does not manipulate switch S3.

The operator may adjust the dial position of speed adjusting device S2 in order to select an operating speed that is normally used for a particular operation. Because speed adjusting device S2 has a position maintaining mechanism, the dial position will be maintained until the operator again adjusts the dial position.

If main switch S1 is pressed inwardly (i.e. turned ON), AC current supplied from AC power supply 20 will be half-wave rectified by diode D and then filtered by resistor R1 and capacitor C1. This half-wave rectified and filtered current is supplied to power supply regulator 14 and a regulated reference voltage is supplied to pin P16 of reference voltage generator 2.

The regulated voltage is also supplied to phase controller 5, which generates a sawtooth voltage that is synchronized with the AC power supply 20 detected by voltage detector 3. Phase controller 5 compares this sawtooth voltage with the voltage output from differential amplifier 7. When the voltage, which is output by differential amplifier 7, exceeds the sawtooth voltage, a timing signal is sent to ON signal output circuit 9. When ON signal output circuit 9 receives that timing signal, it sends a gate-ON signal to the gate of triac Q2, thereby causing triac Q2 to conduct current to motor M.

As described above, the voltage output from differential amplifier 7 is relatively high when the target speed is high (see voltage level 5), and relatively low when the target speed is low (see voltage level 6). However, when the actual operating speed is low compared to the target speed, the output voltage is corrected to be high (see voltage levels 5L and 6L), and when the actual opening speed is high compared to the target speed, the output voltage is corrected to be low (see voltage levels 5H and 6H).

As described above, phase controller 5 compares the sawtooth voltage (shown in line 7 of FIG. 3(D)) with the voltage output from differential amplifier 7. When the latter becomes greater than the former, a timing signal is sent to ON signal output circuit 9, and ON signal output circuit 9 sends a gate-ON signal, thereby causing triac Q2 to conduct current to motor M.

The arc timing is adjusted to be earlier in the sine wave (AC voltage) as the voltage output from differential amplifier 7 increases. As the timing becomes earlier, the power-ON interval for motor M lengthens and motor M rotates at a higher speed.

Because the voltage output from differential amplifier 7 basically becomes higher as the target speed increases, the power-ON interval for motor M is extended If the actual motor operating speed is slower than the target speed the voltage is corrected to be even higher and the power-ON interval is lengthened If the actual motor speed is faster than the target speed, the voltage is corrected to be lower and the power-ON interval is shortened In this manner, the rotating speed of motor M is adjusted to quickly match the target speed that has been set by the operator.

Similarly, because the voltage output from differential amplifier 7 decreases as the target speed decreases, the power-ON interval for motor M becomes shorter. If the actual motor operating speed is faster than the target speed, the voltage is corrected to be lower and the power-ON interval is shortened If the actual motor speed is slower than the target speed, the voltage is corrected to be higher and the power-ON interval is lengthened In this manner, the rotating speed of motor M is adjusted to match the target speed that has been set by the operator.

If fixed operating speed switch S3 is switched to contact B (on state or second position of switch S3), the voltage that is input to differential amplifier 7 will be the reference voltage divided by R15/(R17+R16). If R17 has been preset to equal the minimum resistance of R5, the voltage at U11 is will equal the voltage generated when speed adjusting device 52 is adjusted to the minimum speed side.

Therefore, when fixed operating speed switch 53 is switched to contact B, the voltage at U11 will be the same as when speed adjusting device 52 is adjusted to its minimum speed position, regardless of the dial position of speed adjusting device 52. As a result the operating speed of motor M will be adjusted to the minimum speed.

The operation of the representative electric power polisher can be improved by using the circuit of FIG. 2. Speed adjusting device 52 usually is adjusted in advance to the high speed position. Fixed operating speed switch S3 is manipulated only after wax replenishment is performed, and can switch to the minimum speed. Thus, the operator can easily, quickly and reliably switch between appropriate high and low speeds when performing a polishing operation.

Figure 4:
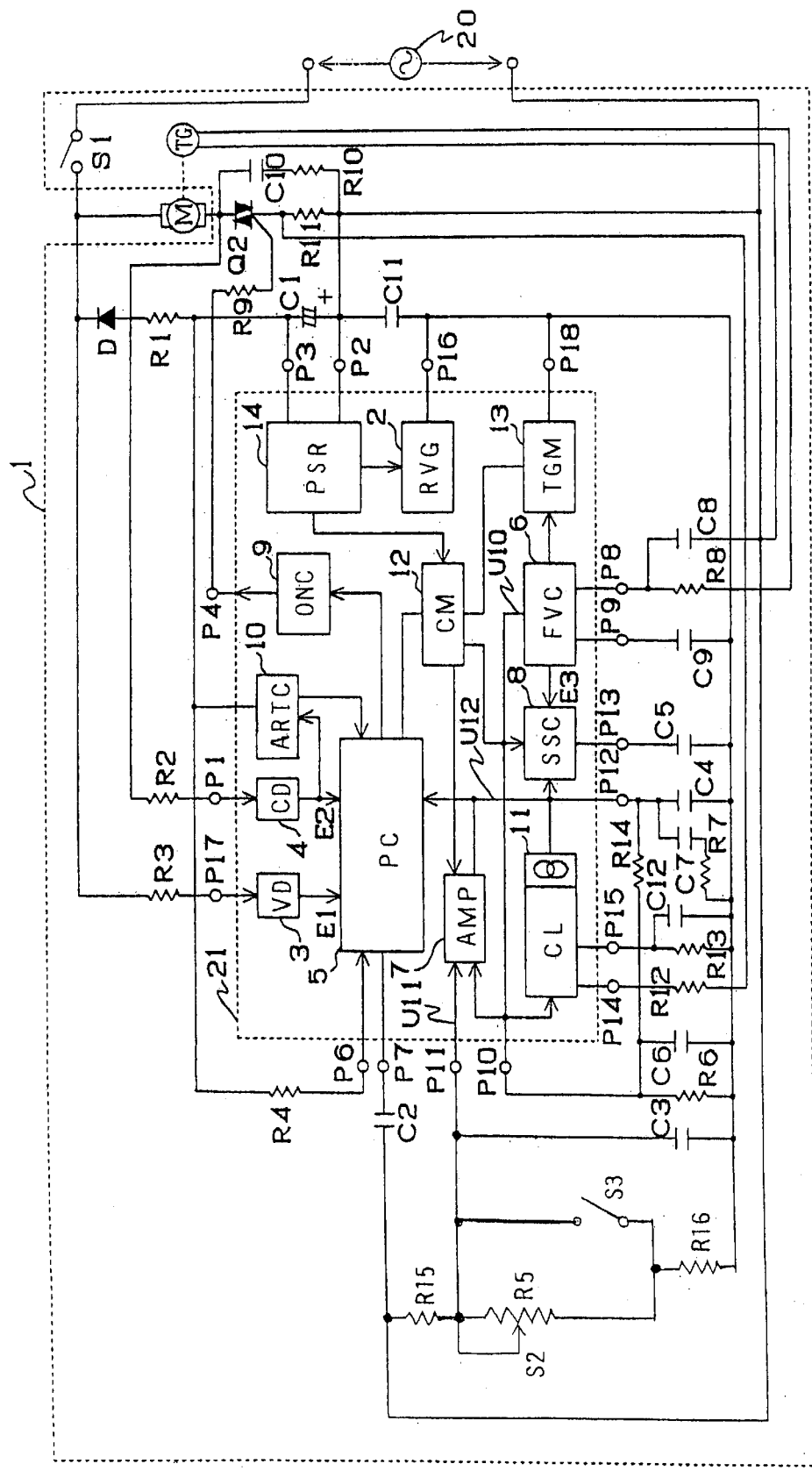
FIG. 4 shows an electrical circuit diagram of a second representative power controller that can be utilized with the representative electric polisher.

A second representative embodiment of the control circuit 1 will be described with reference to FIG. 4. The second representative embodiment shares many overlapping circuits with the first representative embodiment and thus, only circuits that are different from the first representative embodiments will be discussed. The same numerals will be utilized from FIG. 2 to represent the same devices in FIG. 4.

In the second representative embodiment, if fixed operating speed switch S3 is closed (on state), a short circuit will be established that bypasses variable resistor R5. Similar to the first representative embodiment, a negative reference voltage is applied to resistor R16 and resistor R15 is grounded If the short circuit is completed, the voltage coupled to input pin P11 of differential amplifier 7 will be minimized In other words, when switch S3 is switched to the ON state, the voltage coupled to input pin P11 will be the same as the voltage generated when switch S3 is disconnected (i.e. OFF state), and speed adjusting device S2 is adjusted to the minimum speed position. Preferably, the minimum resistance of variable resistor R5 is approximately zero.

Consequently, when fixed operating speed switch S3 is switched ON and the short circuit is completed, a voltage is generated that is equal to the voltage generated when speed adjusting device S2 is set to the minimum speed position. This voltage is coupled to input pin P11 of differential amplifier 7, regardless of the dial position of speed adjusting device S2. Thus, in the embodiment shown in FIG. 4, when switch S3 is closed (i.e., the connected state), the operating speed will be adjusted to the minimum operating speed for the power tool.

Figure 5:
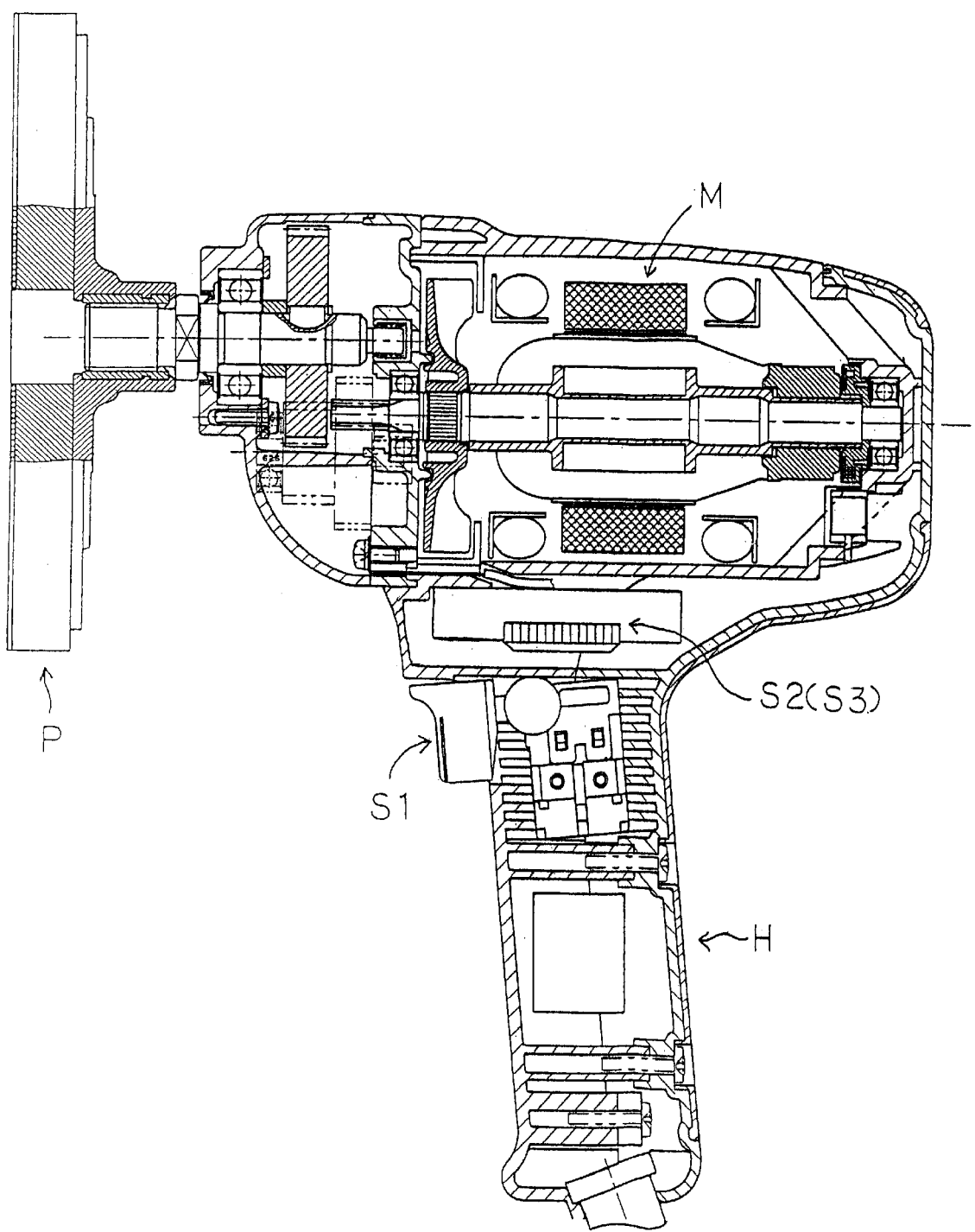
FIG. 5 shows a second representative electric polisher of the present teachings.

In the second representative embodiment of a power polisher shown in FIG. 5, device S2 and switch S3 can be replaced with a single dial type speed adjusting member S2 that is configured to include both a volume switch and an ON/OFF contact switch The single dial type devices having both variable resistance and an ON/OFF switch are widely used, for example, to control the operation and volume of a car radio. Part Number 12SF-07-9 manufactured by Tsubame Wireless Inc, Japan is particularly suitable for this purpose. The present single dial type device preferably has contact point (S3) and volume dial (S2) can rotate from a first position, in which variable resistor R5 has a minimum resistance (low speed position), through a second position, in which variable resistor R5 has a maximum resistance (high speed position), to a third position, which corresponds to the ON state of contact switch S3. The ON state corresponds to the closed state of switch S3 shown in FIG. 4, in which the resistance of the target speed control circuit is minimized Thus, the target speed will be low when switch S2 is moved to the third position. More preferably, the second and third positions are located very close together so that only a small adjustment is necessary to switch between the second position and the third position.

Accordingly, during normal operation, a power tool having dial type contact point (S3) and variable resistor (S2, R5) is adjusted to the high speed position (i.e., the second position) and the operating speed will be relatively high. When required, the device S2/S3 can be moved to the third position, which will switch the power tool to low speed operation. Again, only a slight adjustment of dial type device S2/S3 is necessary, if the second and third positions are spaced close together.

Thus in power tools of the second representative power polisher, the functions of speed adjusting device S2 and fixed operating speed switch S3 may be combined into a single component to simplify construction and operation.

Figure 6:
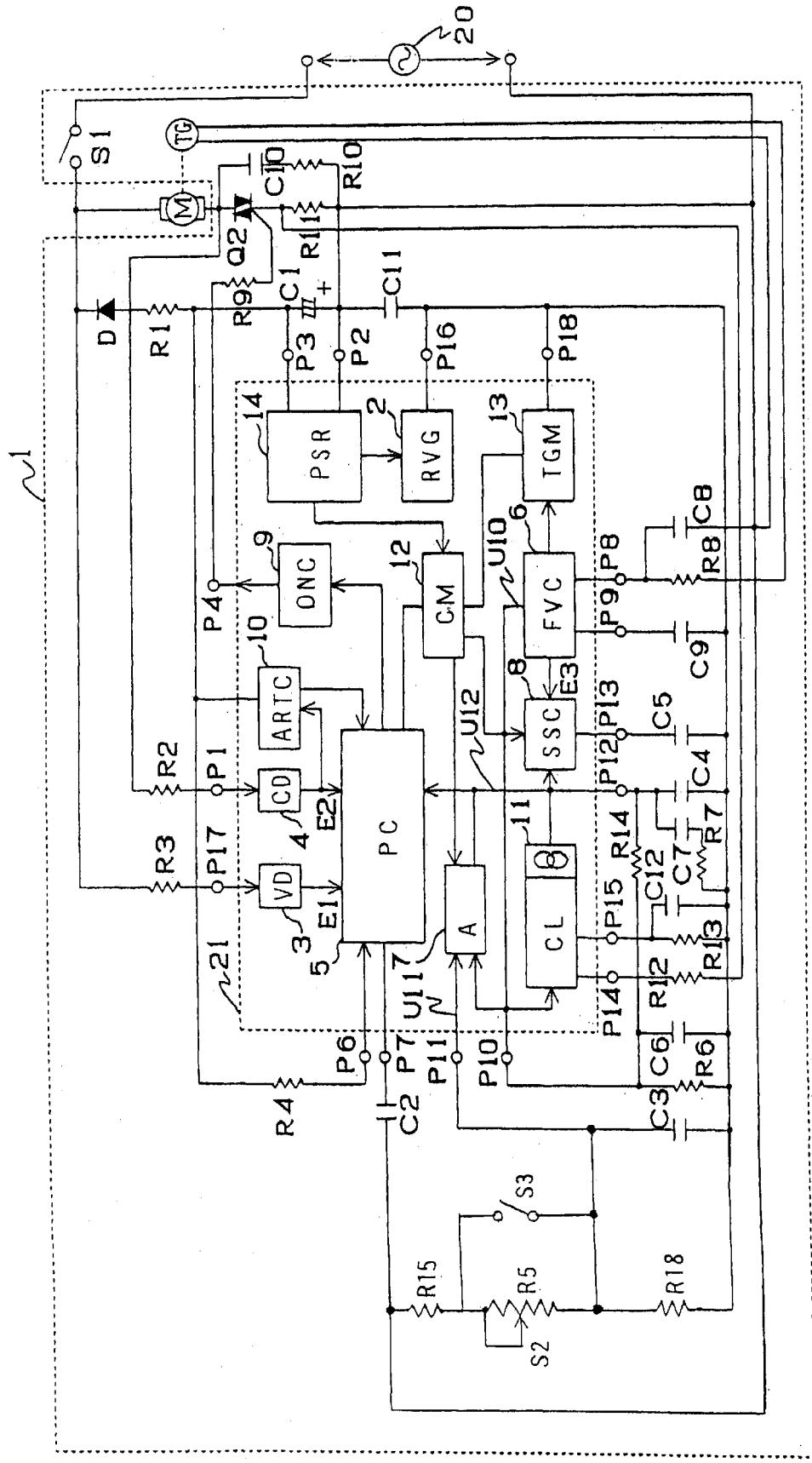
FIG. 6 shows an electrical circuit diagram of a third representative power controller that can be utilize with the second representative electric polisher.

A third representative control circuit will be described with reference to FIG. 6, in which the preset operating speed is adjusted to the maximum speed. The third representative embodiment shares many overlapping circuits with the first and second representative control circuits and thus, only circuits that are different from the first and second representative control circuit will be diseussed The same numerals will be utilized from FIGS. 2 and 4 to represent the same devices in FIG. 6.

If switch S3 is open (i.e. OFF state) the reference voltage will be divided by the ratio (R15 +15 R5)R8, which divided reference voltage is coupled to pin P11 of differential amplifier 7. The resistance of variable resistance R5 becomes relatively large when speed adjusting device S2 is adjusted to the low speed side, and becomes relatively small when speed adjusting device S2 is adjusted to the high speed side. Consequently, the divided voltage coupled to input pin P11 of differential amplifier 7 becomes a low voltage when speed adjusting device S2 is adjusted to the low speed side, and becomes a high voltage when speed adjusting device S2 is adjusted to the high speed side. Therefore, similar to the first representative embodiment, when speed adjusting device S2 is adjusted to the low speed side, the operating speed of motor M is reduced, and when speed adjusting device S2 is adjusted to the high speed side, the operating speed of motor M is increased.

If fixed operating speed switch S3 is closed (i.e. ON state), resistor R5 is bypassed and the voltage input to input pin P11 of differential amplifier 7 is the same as the voltage when speed adjusting device S2 is adjusted to the maximum speed position. Thus, regardless of the dial position of speed adjusting device S2, the rotating speed of motor M is adjusted to the maximum speed In FIG. 5, the preset operating speed is set to the maximum speed. The control circuit shown in FIG. 6 may be incorporated in the polisher shown in FIG. 1 and the polisher in FIG. 5.

A fourth representative control circuit will be described with reference to FIGS. 7 and a third representative power polisher will be described with reference to FIG. 8. By adding a transistor to the voltage divider circuit of the first representative embodiment, the fourth representative embodiment provides three functions. First, the maximum speed can be adjusted by an operator adjustable maximum speed adjusting device S2. Second, the operator can adjust the operating speed within the adjusted maximum speed during operation by an operator adjustable speed adjusting device S4. Third, the maximum speed can be switched to a preset maximum speed by a preset maximum speed switch S3.

Figure 7:
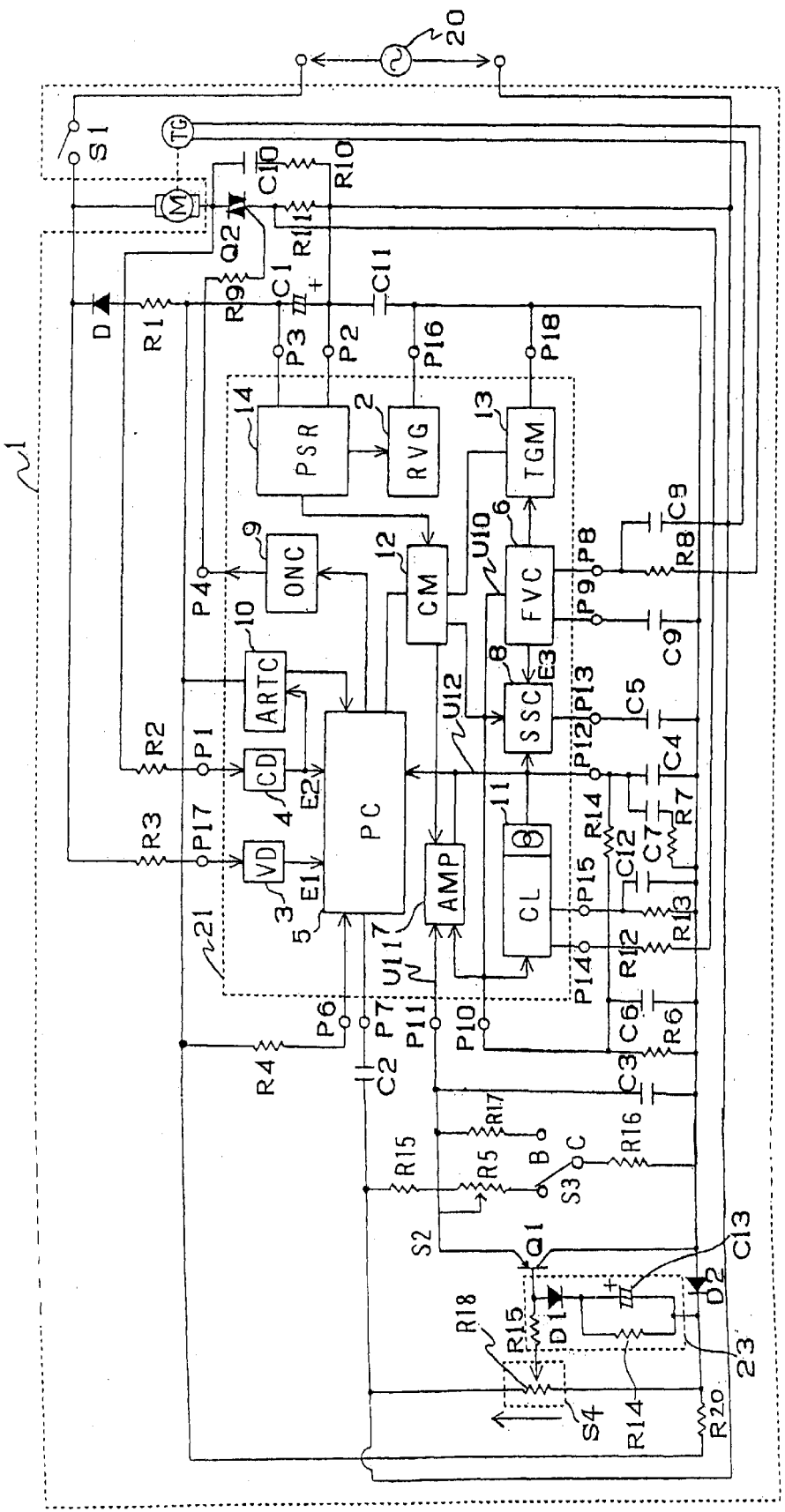
FIG. 7 shows an electrical circuit diagram of a fourth representative power controller that can be utilizd with a third representative electric polisher.

The circuit of FIG. 7 has a circuit (shown to the left of transistor Q1) that is added to the circuit of the first embodiment If the circuit to the left of transistor Q1 is not added, the divided voltage coupled to input pin P11 of differential amplifier 7 would be the negative reference voltage divided by the ratio of R15/(R5+R16), which the same as the first embodiment. This voltage would increase as speed adjusting device S2 is adjusted to the high speed side, and would decrease as adjustment is made to the low speed side.

In the fourth representative control circuit of FIG. 7, a transistor Q1 and is used to lower the voltage coupled to input pin P11 to a voltage that is below the divided voltage of the first representative embodiment. As a result speed adjusting device S2 does not adjust the normal operating speed of the power tool, but rather adjusts the maximum speed. Therefore, in this representative embodiment, adjusting device S2 is not a speed adjusting device having a position maintaining mechanism, but rather is a maximum speed adjusting device having a position maintaining mechanism.

Figure 8:
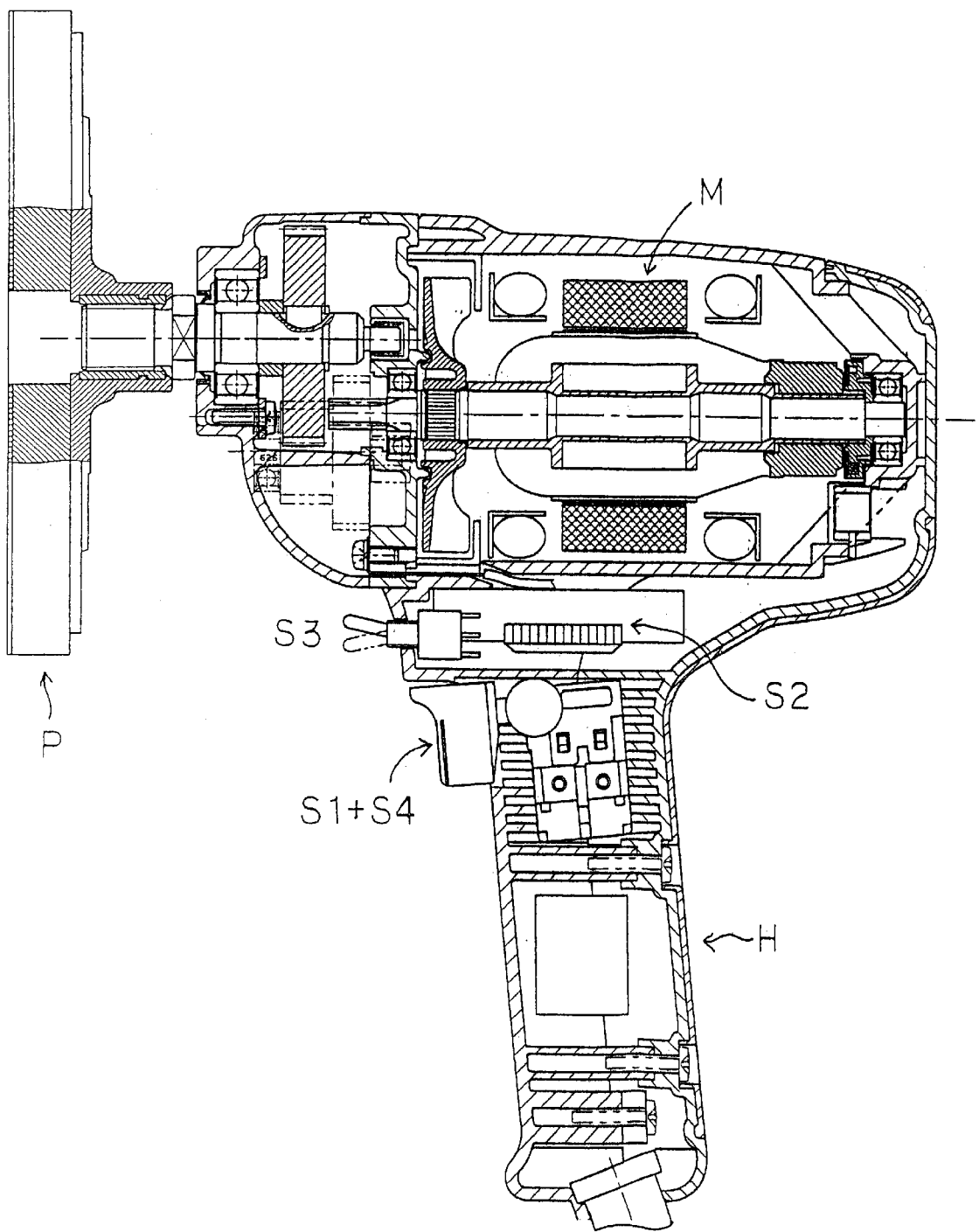
FIG. 8 shows the third representative electric polisher of the present teachings.

In electric power tools of this representative embodiment, switch (S1+S4) of FIG. 8 is both a main switch S1 that urns the power tool ON/OFF and a volume switch S4 that increases or decreases the resistance of variable resistor R18 according to the amount of adjustment by the operator. Switch (S1+S4) is biased by a spring (not shown) to return to the OFF position, which is the original position.

If the operator slightly moves switch (S1+S4) of FIG.8, main switch S1 of FIG. 7 turns ON. If switch (S1 +S4) is pressed deeply, the brush of variable resistor R18 will move upward in FIG. 7. If the pressure on switch (S1+S4) is relaxed, the brush will move downward Naturally, if pressure is completely removed, main switch S1 will turn OFF. Within the maximum speed adjusted by the position of maximum speed adjusting device S2, switch S4 adjusts the position so that the operator can adjust the speed When switch S4 is not being operated by the operator, it will return to its original position, due to the biasing force of the spring.

In this circuit, the resistance between the collector and emitter of transistor Q1 (hereafter simply referred to as the transistor resistance) contributes to the voltage division and adjusts the value of the voltage at node U11.

The resistance of transistor Q1 changes depending upon the base voltage of transistor Q1, which is divided by variable resistor R18. If speed adjusting device S4 is moved slightly, the brush position is at the bottom as shown in FIG. 7. As the base voltage decreases (a negative reference voltage is applied to the bottom of resistor R18 and the top is grounded), the resistance of transistor Q1 becomes lower. If speed adjusting device S4 is moved substantially, the brush position moves upwards, the base voltage becomes higher (approaching ground voltages and the transistor resistance increases. In this representative embodiment, prior to the maximum adjustment of speed adjusting device S4, the base voltage is sufficiently close to the ground voltage to turn or bias OFF transistor Q1. In other words, the resistance becomes essentially infinite. When the resistance of transistor Q1 is essentially infinite, the operation of the control circuit of FIG. 7 is the same as that of the control circuit of FIG. 2.

However, if transistor Q1 is conducting, a circuit is completed which is parallel to the series circuit of resistor R5 and resistor R16. Thus, the voltage at node U11 decreases as the resistance of transistor Q1 decreases.

As described above, the voltage at node U11 corresponds to the target speed. As this voltage increases, the target rotating speed increases. As this voltage decreases, the target ring speed decreases. When speed adjusting device S4 is adjusted such that transistor Q1 is OFF, the voltage generated as a result of the position of maximum speed adjusting device S is coupled directly to differential amplifier 7. However, if speed adjusting device S4 is adjusted such that the resistance of transistor Q1 is low, the voltage coupled to input pin P11 of differential amplifier 7 is lower than the voltage generated by the position of maximum speed adjusting device S2.

When the position of speed adjusting device S4 having the return-to-origin mechanism is moved to its full range, the transistor resistance becomes infinite and the resistance of variable speed resistor R5 determines the target speed, or in other words, the maximum speed. Therefore, adjusting member S2 functions as the maximum speed adjusting device. On the other hand, adjusting member S4, which determines the resistance of transistor Q1, performs the function of adjusting the rotational speed of the motor within the range of maximum speed regulated by the position of maximum speed adjusting device S2. Naturally, the voltage input to input pin P11 of differential amplifier 7 is the voltage representative the position of maximum speed adjusting device S2 divided by the position of speed adjusting device S4. Further, due to the existence of transistor Q1, the voltage is not corrected to be higher than the divided voltage obtained in the case of FIG. 2 and the speed is not adjusted to be greater than or equal to the rotating speed selected by the position of maximum speed adjusting device S2.

When speed adjusting device S4 having the return-to-origin mechanism is moved, if the base voltage of transistor Q1 suddenly increases, a sudden, large current will be applied to the motor and the power tool will vibrate. However, time constant circuit 23, which includes resistor R14 and capacitor 13, is preferably included to gradually increase the base voltage, so that the rotating speed of the motor will gradually increase when speed adjusting device S4 is adjusted.

In the control circuit of FIG. 7, the target voltage is the voltage divided by the ratio of R15/(R5+R16) (R5 changes according to the position of maximum speed adjusting device S2) and further divided by the changing resistance between the collector and emitter of transistor Q1, which resistance is determined based upon the position of speed adjusting device S4.

In this case, if switch S3 is switched to the B contact, the preset voltage described in the first representative embodiment and FIG. 2 is divided by the resistance of transistor Q1. This divided voltage is input to differential amplifier 7 as the voltage representative of the target speed In this case, the preset voltage is divided by the resistance determined by the position of speed adjusting device S4, which is then input to differential amplifier 7.

Figure 9:
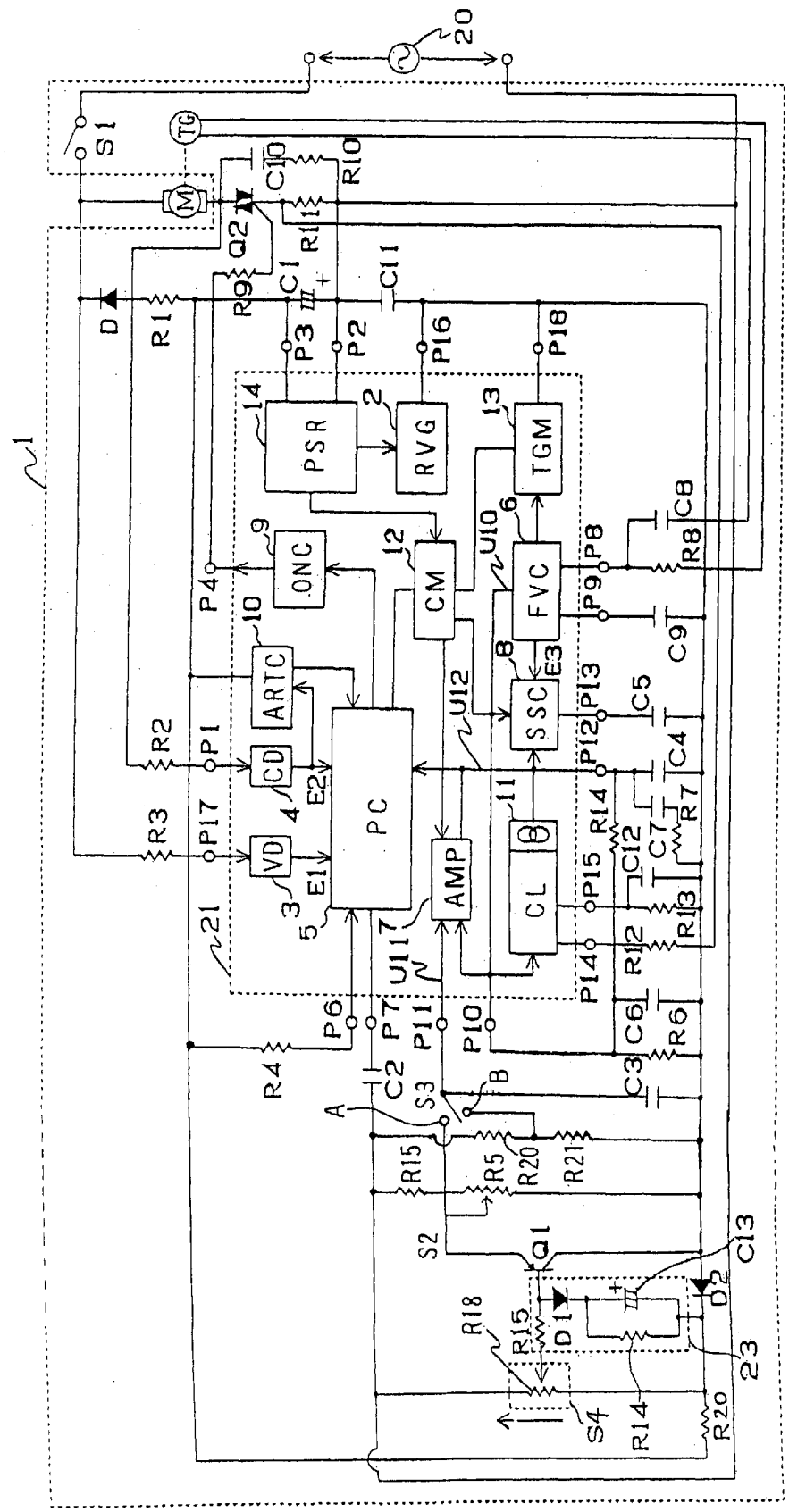
FIG. 9 shows an electric circuit diagram of a fifth representative power controller.

Instead of the control circuit shown in FIG. 7, it is possible to input the predetermined constant voltage to the input pin P11 when the switch S3 is connected to B contact This modified electric circuit is shown in FIG. 9. In this case, the predetermined constant voltage is input regardless the position of the speed adjusting device S4. According to this control circuit, the switch S3 functions as a fixed operating speed switch rather than the preset maximum speed switch.

Although the present teachings are most applicable to electric power tools, the present teachings also can be applied to non-electric power tools, such as air power screwdrivers, that operate using compressed air. In such case, the present teachings can be realized using a control circuit or computer control circuit that opens and closes an electromagnetic flow valve to control the flow of the compressed air used as the power source.

In addition, various modifications can be made to the present representative embodiments without departing from the spirit of the invention. For example, while a dial type speed adjusting device is shown in FIG. 1, any type of speed adjusting device can be utilized with the present teachings. For example, other types of suitable operator adjustable speed adjusting devices include analog devices that may set any operating speed within a continuous range of operating speeds or digital devices that may set an operating speed from within a discrete set of operating speeds.

Other useful features that may be utilized with the present teachings are taught by U.S. Pat. No. 6,060,850, the description of which is hereby incorporated by reference in its entirety.

What is claimed is:

1. A power tool comprising:
   an operator adjustable speed adjusting device having a position maintaining mechanism and
   an fixed operating speed switch coupled to the operator adjustable speed adjusting device, the fixed operating speed switch having at least a first position and a second position, wherein the first position of the fixed operating speed switch causes the operating speed of the power tool to be determined by the speed adjusting device and the second position of the fixed operating speed switch causes the operating speed of the power tool to be a preset operating speed.

2. A power tool as in claim 1, wherein the preset operating speed is set by a manufacturer of the an power tool.

3. A power tool as in claim 1, wherein the preset operating speed is set by an operator of the power tool.

4. A power tool as in claim 1, further comprising a control circuit adapted to control the operating speed of a motor of the power tool according to a target speed using feedback control, wherein a voltage corresponding to the target speed is compared to a voltage corresponding to an actual operating speed of the motor and a signal is generated that controls the operating speed of the motor.

5. A power tool as in claim 4, the power tool is a power polisher and the operator adjustable speed adjusting device and the fixed operating speed switch are positioned within a handle for an operator to grip the power polisher.

6. A power tool as in claim 4, the power tool is a power polisher and the operator adjustable speed adjusting device and the fixed operating speed switch are incorporated within a single device.

7. A power tool as in claim 4, the power tool is a power polisher and the preset operating speed is a minimum speed.

8. A power tool as in claim 4, the fixed operating speed switch has a position marinating mechanism.

9. A power tool comprising:
   an operator adjustable maximum speed adjusting device having a position maintaining mechanism, wherein the operator adjustable maximum speed adjusting device sets a maximum operating speed,
   an operator adjustable speed adjusting device having a return-to-origin mechanism, wherein the operator adjustable speed adjusting device sets an actual operating speed that is between the maximum operating speed and a minimum operating speed and
   a preset maximum speed switch having a first position and a second position, wherein the first position of the preset maximum speed switch causes the operating speed of the power tool to be determined by the operator adjustable maximum speed adjusting device and the operator adjustable speed adjusting device and wherein the second position of the preset maximum speed switch causes the operating speed of the power tool to be determined by the operator adjustable speed adjusting device.

10. A power tool as in claim 9, further comprising a control circuit adapted to control the operating speed of a motor of the power tool according to a target speed using feedback control, wherein a voltage corresponding to the target speed is compared to a voltage corresponding to an actual operating speed of the motor and a signal is generated that controls the operating speed of the motor.

11. A power tool as in claim 10, the power tool is a power polisher and the operator adjustable maximum speed adjusting device, the operator adjustable speed adjusting device and the preset maximum speed switch are positioned within a handle for an operator to grip the power polisher.

12. A power tool as in claim 10, the power tool is a power polisher and the preset maximum speed switch has a position maintaining mechanism.

13. A power tool comprising:
   an operator adjustable maximum speed adjusting device having a potion maintaining mechanism, wherein the operator adjustable maximum speed adjusting device sets a maximum operating speed,
   an operator adjustable speed adjusting device having a return-to-origin mechanism, wherein the operator adjustable speed adjusting device sets an actual operating speed that is between the maximum operating speed and a minimum operating speed and
   a fixed operating speed switch having a first position and a second position, wherein the first position of the fixed operating speed switch causes the operating speed of the power tool to be determined by the operator adjustable maximum speed adjusting device and the operator adjustable speed adjusting device and wherein the second position of the fixed operating speed switch causes the operating speed of the power tool to be a preset operating speed.

14. A power tool comprising:
   a motor,
   a speed adjusting device arranged and constructed to generate a plurality of voltages, each voltage representative of a target speed for the motor,
   a voltage source generating a fixed voltage,
   a control circuit arranged and constructed to control motor operating speed using feedback control in accordance with a selected target speed, which selected target speed is represented by the fixed voltage or the voltage generated by the speed adjusting device, and
   a switch being selectively connectable to one of the fixed voltage and the voltage generated by the speed adjusting device, the control circuit being further arranged and constructed to compare the voltage selected by the switch to a voltage representative of an actual operating speed of the motor and to generate a signal for adjusting the actual operating speed of the motor based upon the comparison of the selected voltage and the voltage representative of the actual operating speed.

15. A power tool as in claim 14, wherein the speed adjusting device and the switch are integrated within a single device.

16. A power tool as in claim 15, wherein the single device is adjustable between a first position for generating a minimum target speed voltage and a third position that couples the fixed voltage to the control circuit via a second position for generating a maximum target speed voltage.

17. A power tool as in claim 16, further comprising a polishing buff coupled to the motor.

18. A power tool as in claim 17, wherein the fixed voltage equals the minimum target speed.

19. A power tool comprising:

a motor, a maximum speed adjusting device arranged and constructed to generate a plurality of voltages, each voltage representative of a target motor operating speed, the maximum speed adjusting device having a position maintaining mechanism, a speed adjusting device arranged and constructed to generate a plurality of resistance ratios, the speed adjusting device having a return-to-origin mechanism, a voltage source generating a fixed voltage representative of a predetermined target motor operating speed, a switch for selecting a voltage representative of the target motor operating speed, the switch being selectively connectable to:

(a) the voltage generated by the maximum speed adjusting device divided by the resistance ratio generated by the speed adjusting device, and (b) the fixed voltage divided by the resistance ratio generated by the speed adjusting device, and a control circuit arranged and constructed to control actual motor operating speed using feedback control in accordance with the voltage representative of the target motor operating speed selected by the switch, wherein the control circuit is further arranged and constructed to compare the voltage selected by the switch to a voltage representative of an actual motor operating speed of the motion and to generate a signal for adjusting the actual motor operating speed based upon the comparison of the selected voltage and the voltage representative of the actual motor operating speed.

20. A power tool comprising:

a motor, a maximum speed adjusting device arranged and constructed to generate a plurality of voltages, the maximum speed adjusting device having a position maintaining mechanism, a speed adjusting device arranged and constructed to generate a plurality of resistance ratios, the speed adjusting device having a return-to-origin mechanism, a voltage source generating a fixed voltage representative of a predetermined target motor operating speed, a switch for selecting a voltage representative of the target motor operating speed, the switch being selectively connectable to:

(a) the voltage generated by the maximum speed adjusting device divided by the resistance ratio generated by the speed adjusting device, and (b) the fixed voltage, and a control circuit arranged and constructed to control motor operating speed using feedback control in accordance with the target motor operating speed selected by the switch, wherein the control circuit is further arranged and constructed to compare the voltage selected by the switch to a voltage representative of an actual motor operating speed and to generate a signal for adjusting the actual motor operating speed based upon the comparison of the selected voltage and the voltage representative of the actual operating speed.

21. A method for changing an operating speed of a power tool comprising:

selecting the operating speed from a range of operating speeds, driving a power tool motor at the selected motor operating speed, switching the operating speed to a predetermined motor operating speed, and driving the power tool motor at the predetermined motor operating speed.

22. A method as in claim 21, wherein the predetermined motor operating speed is less than the range of operating speeds.

23. A method as in claim 21, wherein the predetermined motor operating speed is the lowest motor operating speed within the range of motor operating speeds.

24. A method as in claim 21, wherein the predetermined motor operating speed is the highest motor operating speed within the range of motor operating speeds.

25. A method as in claim 21, wherein the motor operating speed selecting step comprises adjusting a resistance value of a potentiometer coupled to the power tool motor.

26. A method as in claim 21, wherein selecting the operating speed from the range of operating speeds further comprises actuating a first switch in order to operate the power tool motor at the selected motor operating speed.

27. A method as in claim 26, wherein switching the operating speed to the predetermined motor operating speed further comprises actuating a second switch in order to operate the power tool motor at the predetermined motor operating speed.

28. A Power tool comprising:

means for selecting a motor operating speed for a power tool motor from a range of operating speeds, means for driving the power tool motor at one of the selected motor operating speed and a predetermined motor operating speed, and means for switching the operating speed to the predetermined motor operating speed.

* * * * *